(12) United States Patent
Bakker et al.

(10) Patent No.: US 11,785,962 B2
(45) Date of Patent: Oct. 17, 2023

(54) GELATIN-FREE AERATED CONFECTIONERY PRODUCTS AND METHODS FOR PREPARING THE SAME

(71) Applicant: Coöperatie AVEBE U.A., Veendam (NL)

(72) Inventors: Wybren Bakker, Groningen (NL); Gertjan Klijnstra, Groningen (NL); David Thomas Benjamin Tomasoa, Marum (NL)

(73) Assignee: Coöperatie AVEBE U.A., Veendam (NL)

( * ) Notice: Subject to any disclaimer, the term of this patent is extended or adjusted under 35 U.S.C. 154(b) by 223 days.

(21) Appl. No.: 16/486,441

(22) PCT Filed: Mar. 21, 2018

(86) PCT No.: PCT/NL2018/050176
§ 371 (c)(1),
(2) Date: Aug. 15, 2019

(87) PCT Pub. No.: WO2018/174713
PCT Pub. Date: Sep. 27, 2018

(65) Prior Publication Data
US 2020/0214314 A1 Jul. 9, 2020

(30) Foreign Application Priority Data
Mar. 21, 2017 (EP) .................................... 17162116

(51) Int. Cl.
*A23G 3/42* (2006.01)
*A23G 3/34* (2006.01)
*A23G 3/44* (2006.01)
*A23G 3/52* (2006.01)

(52) U.S. Cl.
CPC .............. *A23G 3/42* (2013.01); *A23G 3/0019* (2013.01); *A23G 3/44* (2013.01); *A23G 3/52* (2013.01); *A23V 2002/00* (2013.01)

(58) Field of Classification Search
CPC .......... A23G 3/42; A23G 3/0019; A23G 3/44; A23G 3/52; A23V 2002/00
USPC ......................... 426/571, 564, 572, 658, 660
See application file for complete search history.

(56) References Cited

U.S. PATENT DOCUMENTS

2005/0013923 A1    1/2005   Shimek et al.

FOREIGN PATENT DOCUMENTS

| EP | 1920662 A1 | 5/2008 |
|---|---|---|
| EP | 2007216 A1 | 12/2008 |
| RU | 2410892 C2 | 2/2011 |
| WO | 9742834 A1 | 11/1997 |
| WO | 2007114719 A1 | 10/2007 |
| WO | 2015170983 A1 | 11/2015 |

*Primary Examiner* — Leslie A Wong
(74) *Attorney, Agent, or Firm* — HOFFMANN & BARON, LLP

(57) ABSTRACT

The invention relates to the manufacture of foods, in particular to aerated confectionery products, like marshmallow-type products, to foam structuring compositions, and methods for preparing them. Provided is an aerated confectionery product having a density up to 0.5 g/cm$^3$, the product comprising as foam structuring composition a combination of (i) a native potato protein; (ii) a gelling starch; and (iii) a highly branched starch (HBS) obtained by treatment of starch or a starch derivative with glycogen branching enzyme (EC 2.4.1.18), and wherein said HBS has a molecular branching degree of at least 6%, wherein the molecular branching degree is defined as the percentage of α-1,6 glycosidic linkages of the total of α-1,6 and α-1,4 glycosidic linkages ((α-1,6/(α-1,6+α-1,4)*100%).

20 Claims, No Drawings

GELATIN-FREE AERATED CONFECTIONERY PRODUCTS AND METHODS FOR PREPARING THE SAME

This application is the U.S. National Phase of, and Applicant claims priority from, International Patent Application Number PCT/NL2018/050176 filed Mar. 21, 2018, which claims priority from EP 17162116.2 filed Mar. 21, 2017, each of which is incorporated herein by reference.

The invention relates to the manufacture of foods. More in particular, it relates to aerated confectionery products, like marshmallow-type products, to foam structuring compositions, and methods for preparing them. It also relates to a vegetarian or vegan aerated confection product afforded by replacing the prior art marshmallow ingredient gelatin, an element of animal origin, with a foam structuring composition of the invention which is of entirely plant origin.

While there are many types of marshmallow products on the market, their methods of preparation generally fall into two main process groups: extruded marshmallow and deposited marshmallow. In both types, a sugar syrup, a structuring agent, and a whipping agent are the main ingredients. Often, gelatin is used as both the whipping agent to form an aerated foam as well as the structuring agent for setting the foam. Typically, the sugar syrup heated to dissolve solids and then boiled to reduce moisture and is thereafter cooled, and then combined with the gelatin solution to form a slurry. That slurry is then aerated to form a foam. Optionally, colors and flavors are added to the foam immediately after aeration although in certain embodiments these adjuvants are added to the syrup prior to aerating. The particular marshmallow product may be formed into its final shape by an extrusion process. That is, after aeration, the foam is extruded through a die to form a rope. The die imparts the desired peripheral shape to the extrudate rope. The rope is allowed to rest briefly to set, and it maybe dusted or enrobed with starch before being cut into desired sizes.

Conveniently, a starch or dextrose coating can be applied to the extrudate rope to minimize the stickiness of the rope. The drying time determines the final hardness and dry matter. The marshmallow can have a final moisture content of about 5 to 20%, preferably about 5 to 15% (Aw value between 0.60-0.75).

A drawback of conventional marshmallow-type products is that the presence of gelatin (a mixture of proteins of animal origin) as a basic ingredient may make them undesirable to those observing vegetarian, vegan, kosher, or halal diets. There is an unmet need for gelatin-free marshmallow-type products, in particular those having a texture and taste similar to gelatin-based products.

It was surprisingly found that gelatin can be replaced with a foam structuring composition comprising a unique combination of a native potato protein ingredient and at least two distinct starches of vegetable origin. Without wishing to be bound by theory, the protein component serves as aerator and the starch combination as texturizer.

In one embodiment, the invention provides a foam structuring composition, e.g. for use in the manufacture of an aerated confectionery product having a density up to 0.5 g/cm³, the product comprising as foam structuring composition a combination of:
  (i) a native potato protein;
  (ii) a gelling starch comprising a modified potato starch, an acid-degraded starch, a oxidative degraded starch and/or an enzymatically degraded starch; and
  (iii) a highly branched starch (HBS) obtained by treatment of starch or a starch derivative with glycogen branching enzyme (EC 2.4.1.18), and wherein said HBS has a molecular branching degree of at least 6%, wherein the molecular branching degree is defined as the percentage of α-1,6 glycosidic linkages of the total of α-1,6 and α-1,4 glycosidic linkages ((α-1,6/(α-1,6+α-1,4) *100%).

The invention also provides a an aerated confectionery product having a density up to 0.5 g/cm3, the product comprising a foam structuring composition of the present invention.

An aerated confectionery product or foam structuring composition according to the invention is not taught or suggested in the art.

U.S. Pat. No. 5,429,830 relates to a soft spongy marshmallow-type confection which is rendered heat stable up to 250° C. by the inclusion of a colloidal form of microcrystalline cellulose (MCC). In additional embodiments, the confection optionally further comprises entirely non-animal (vegetal) matter by the replacement of the usual animal-origin gelatin ingredient with a vegetal gum, and/or optionally further comprises a reduced calorie confection by the replacement of some of the high-calorie sugars by a bulking agent which is a non-colloidal form of MCC further optionally including one or more low-calorie sugars. No (vegetable) protein is used.

U.S. Pat. No. 7,214,401 discloses a method to aerate a carbohydrate containing food product. The method is characterized by the use of a vegetable protein that is hydrolysed under alkali conditions as whipping agent. The hydrolysed vegetable protein has an average peptide chain length in the range of 6 to 18 amino acids and most preferably 7 to 15 amino acids. The preferred vegetable protein source is pea protein. Starch is mentioned as exemplary hydrocolloid but no combination of starches according to the present invention is taught or suggested.

WO2015/170983 in the name of the applicant relates to chewy candy comprising HBS. However, chewy candies have a density well above 0.5 g/cm³. Moreover, WO2015/170983 is completely silent about using HBS in combination with a native potato protein and a second type of vegetable starch.

WO97/42834 relates to the use of undenatured potato protein as an ingredient in food compositions, among others whipped product like mousse or whipped cream. Nothing is taught or suggested about aerated, low density confectionary products of the present invention, let alone that for such products native potato protein is to be combined with HBS and a gelling starch to obtain a product with the desired overrun and the corresponding low density of a product. According to the invention, the native potato protein for use as foam structuring agent preferably comprises a low molecular weight potato protein isolate. In one embodiment, the native potato protein isolate has an isoelectric point above 5.5, preferably above 5.8, a molecular weight of below 35 kDa, preferably of 4-30 kDa, and a glycoalkaloid concentration of less than 300 ppm. Such protein isolates are obtainable by purification methods known in the art. Good results are obtained when an aerated confectionery product comprises the native potato protein in an amount of at least 0.3 wt %, preferably between 1-5 wt %, more preferably 2-4 wt %.

Potato tuber proteins can be classified in many different groups. Lindner et al. 1980 proposed to use a classification of potato proteins into just two separate groups; acid soluble and acid coagulable potato proteins. The acid coagulable fraction was shown by the author to be dominated by High Molecular Weight (HMW) proteins in the range of 32-87 kDa based on SDS-PAGE analysis. Similarly the acid soluble protein fraction was shown to be dominated by Low Molecular Weight (LMW) proteins in the range of 17-27 kDa proteins. This classification in acid soluble and acid coagulable proteins at the same time groups acidic proteins (acid coagulable/HMW) from basic proteins (acid soluble/LMW) (Ralet & Gueguen 2000). The applicant typically produces these same two potato protein fractions under non-denaturing conditions by means of mixed-mode chromatography referred to as Solanic 200 and Solanic 300. Importantly however, a range of alternative purification methods can be used to obtain at least one of these native potato protein fractions.

Native protein purification methods employ mild processing conditions to avoid denaturation and maintain the secondary and tertiary structure of the protein. These mild conditions avoid the use of extreme pH, temperature and other denaturation conditions (use of solvents, high salt content, etc.). The intrinsic biochemical characteristics of a specific protein (fraction) largely determines whether the protein is either sensitive or resistant to the conditions in the protein isolation process. For example the high molecular weight fraction is more thermal sensitive resulting in insoluble protein aggregates at temperatures of 30° C. or above. The low molecular weight fraction is more temperature resistant and can resist temperatures over 45° C. (Bartova 2008). Similarly, the high molecular weight fraction aggregates and precipitates at pH values in the range of 3 to 5 while the low molecular weight fraction is largely soluble in this pH range. This allows the use of pH and/or temperature to specifically aggregate/precipitate one protein fraction while maintaining the native character of the other.

Native Acid Soluble/LMW/Basic/Solanic 300 Purification Methods:
- Acid coagulation of HMW proteins followed by ultrafiltration & dia-filtration of the soluble LMW proteins (Lindner 1980)
- Fractionated thermal coagulation of HMW protein followed by ultrafiltration & dia-filtration of the soluble LMW proteins (conditions pH 6.0; 30 minutes; 50° C.))
- Adsorption chromatography at a specific pH value:
  - Adsorption/desorption from bentonite type material (Ralla 2012)
  - Ion exchange chromatography using SP-sepharose resin (Ralet & Gueguen 2000)
  - Membrane adsorption chromatography (Graf 2009)
  - Expanded bed adsorption chromatography (Lokra 2009, WO 2008/069650))

Partially denatured potato protein fractions with varying HMW/LMW ratio's have been obtained by various (mild) coagulation and precipitation techniques involving organic solvents, inorganic (metal) salts, carboxymethyl cellulose. (Koningsveld 2002, Barta 2007, Bartova 2009, Partisa 2001). The solubility of these protein precipitates can in some cases be in the range of 70-90% while maintaining (residual) functionality such as foaming (Partisa 2001).

In one embodiment, the native potato protein is obtained by centrifuging a flocculated potato fruit juice, thereby forming a supernatant; subjecting the supernatant to adsorption chromatography operated at a pH of less than 11 and a temperature of 5-35° C. using a mixed-mode adsorbent capable of binding potato protein, thereby adsorbing the native potato protein to the adsorbent; and eluting the low molecular weight potato protein isolate, typically at acidic pH (for example between pH 1 and 3), or at a pH of 5.8-12.0. For details see for example WO2008/069650 in the name of the applicant.

In addition to the native potato protein, an aerated confectionery product or foam structuring composition of the invention is also characterized by the presence of a gelling starch. As used herein, the term "gelling starch" refers to starch that is capable of forming a gel comprising soluble solids in the range of about 50% to about 90% by weight. The gelling starch comprises a modified potato starch, acid-degraded starch, oxidative degraded starch and/or an enzymatically degraded starch, optionally in combination with crosslinked starch, and any combination thereof. Hence, a gelling starch is distinct from HBS. Exemplary gelling starches include crosslinked hydroxypropyl distarch phosphate, acetylated potato starch and amylomaltase-treated starch. In one specific aspect, the gelling starch is a blend of oxidized acetylated starch and crosslinked hydroxypropylated starch, for example as disclosed in EP 146795 B1. In another specific aspect, the gelling starch is an acid degraded and acetylated potato starch.

In a preferred embodiment, an aerated confectionery product according to the invention comprises gelling starch or a combination of gelling starches in a total amount of up to 12 wt %, preferably 7.5 to 10 wt %.

The third characteristic ingredient of an aerated product or structuring composition as provided herein is HBS. Typically, the HBS for use in the present invention has a molecular branching degree of at least 6%. Preferably, it is at least 6.5%, for example in the range of about 7 to about 10%. Preferably, the HBS is present in the aerated confectionery composition in an amount of between 0.5-10 wt %, preferably 1-6 wt %, more preferably 2-4 wt %.

The degree of molecular branching as used herein refers to the relative amount of α-1,6 glycosidic linkages over the total of α-1,6 and α-1,4 glycosidic linkages (($\alpha$-1,6/($\alpha$-1,6+$\alpha$-1,4)*100%) and can be determined by methods known in the art, e.g. using a combination of reducing end determination/isoamylolysis (Palomo M et al. 2009 Appl. Environm. Microbiology, 75, 1355-1362; Thiemann, V. et al, 2006 Appl. Microb. and Biotechn. 72: 60-71) and measuring the total amount of carbohydrate present via the Anthrone/sulphuric acid method (see e.g. Fales, F. 1951 J. Biol. Chem. 193: 113-124). Typically, the degree of branching does not exceed 11-12%.

The resulting starch derivative (herein referred to as HBS) has an average molecular weight (Mw) ranging between $0.5*10^5$ g/mol and $1*10^6$ g/mol, preferably between $0.8*10^5$ g/mol and $1.8*10^5$ g/mol, more preferably between $1*10^5$ g/mol and $1.6*10^5$ g/mol. The HBS typically has an average molecular weight (Mw) of about $1.2*10^5$ g/mol. Molecular mass can be determined using different techniques, known to the person skilled in the art. The molecular weight of the HBS of the invention was determined by GPC-MALLS-RI from Wyatt, USA equipped with a multiangle light scattering instrument (DAWN EOS) and an online viscometer (Viscostar). Refractive index was determined with RI2000 (Schambeck, Germany). The following set of columns was used: as guard column PwXL (Viscotek, USA) and as chromatography columns arranged in series: G4000PwXL and G5000PwXL (Viscotek, USA). A mixture of 50 mM NaNO3 and 0.1 M NaCl and azide was used as running solution. The samples were solubilised in the buffer (mentioned above, 1 mg/ml) and filtered against 0.45 um before injection into the system. 0.2 ml was injected. Flow rate was 0.400 mL/min. Accuracy of the system was verified using dextrin standards (50K, 200K, 400K and 800K).

The glycogen branching enzyme (EC 2.4.1.18) used to prepare HBS can originate from any microbial source but preferably from a mesophilic or thermophilic microorganisms such as *Aquifex aeolicus* or *Rhodothermus obamensis*. Accordingly, in one embodiment the glycogen branching enzyme is a thermostable glycogen branching enzyme obtained from a mesophilic or thermophilic organism, preferably glycogen branching enzyme of *Aquifex aeolicus* or *Rhodothermus obamensis*.

Any native or unmodified starch may be used as starting material for obtaining the HBS for use in the present invention. For example, the highly branched derivative can be derived from non-GMO as well as GMO plant variants of various sources, such as potato, corn, wheat, tapioca, waxy potato, waxy corn, waxy tapioca, high amylose potato, high amylose corn etc.

In a preferred embodiment, the HBS is derived from food grade (acetylated) potato starch or waxy maize starch.

The aerated confectionery compositions and products fabricated from such compositions essentially comprise about 50 to about 95% of a saccharide component as the principle ingredient. Preferably, the saccharide component is used at about 70% to 90%. of the confectionery compositions. The saccharide component can include pure monosaccharide, like fructose (levulose) or dextrose (e.g., anhydrous, monohydrate or dextrose syrup) and disaccharide sugars such as sucrose, and maltose, as well as hydrolyzed starch syrups such as corn syrup which include dextrin, maltose and dextrose, invert sugar syrups which include dextrose and/or converted fructose or glucose syrups. In one aspect, an aerated confectionery product according to the invention comprises 50-80 wt % of sugar or sugar syrup. A portion of the saccharide component may be supplied by impure or flavored saccharidic ingredients such as fruit juices, purees, honey nectars, concentrated fruit juices, fruit flavors and mixtures thereof. The saccharide component can also include polysaccharides such as cornstarch. Also envisaged are polyols. Polyols, also called sugar alcohols, are a group of versatile, reduced-calorie carbohydrates that provide the taste and texture of sugar with about half the calories. They are advantageously used as food ingredients to replace sugar in an increasing variety of sugar-free and reduced-calorie foods and beverages for their functional and health benefits.

As is clear from the above and the examples herein below, the combination of vegetable-derived protein and starches as disclosed herein fully qualifies as suitable replacement for gelatin in foamed confectionery. Accordingly, in one embodiment the invention provides an aerated confectionery product, like a marshmallow-type product, being essentially gelatin-free. Exemplary (gelatin-free) aerated confectionery product according to the invention include those selected from the group consisting of marshmallows, angel kisses, guimauves and meringues, preferably molded marshmallow, extruded marshmallow, chocolate marshmallow.

A further embodiment relates to a continuous method for preparing an aerated confectionery product. The method comprises the steps of:

A. providing a foam structuring agent comprising
 (i) a native potato protein;
 (ii) a gelling starch; and
 (iii) a highly branched starch (HBS) obtained by treatment of starch or a starch derivative with glycogen branching enzyme (EC 2.4.1.18), and wherein said HBS has a molecular branching degree of at least 6%, wherein the molecular branching degree is defined as the percentage of α-1,6 glycosidic linkages of the total of α-1,6 and α-1,4 glycosidic linkages ((α-1,6/(α-1,6+α-1,4)*100%);

B. Providing a slurry confectionery blend comprising about 50 to 95% of a saccharide component; about 1 to 30% moisture; and about 1 to 30% (on dry weight basis) of the foam structuring agent of step A, and heating the mixture by direct steam pressure;

C. cooling the heated slurry in a vacuum cooler to obtain a confection blend;

D. aerating the confection blend to form an aerated confection foam having a density of about 0.1 to 0.5 g/cm$^8$, preferably between 0.19 and 0.27 g/cm$^8$, and a temperature of at least 70° C., preferably 90-105° C.;

E. extruding the aerated foam at a temperature of about 85 to 100° C. to form an aerated confection extrudate;

F. cooling the extrudate to set the confection to form a set aerated confection extrudate; and, G. forming the set aerated confection extrudate into pieces.

In a further aspect, the invention provides the use of a foam structuring composition according to the invention in the manufacture of an aerated confectionery product having a density up to 0.5 g/cm$^3$. As discussed herein above, the foam structuring composition is advantageously used in the manufacture of an essentially gelatin-free aerated confectionery product. Preferably, it is used in the manufacture of an (gelatin-free) aerated confectionery product selected from the group consisting of marshmallows, angel kisses, guimauves and meringues, preferably molded marshmallow, extruded marshmallow, chocolate marshmallow.

In a preferred embodiment, the foam structuring composition for use in the manufacture of an aerated confectionery product composition comprises (i) 12-23 wt %, preferably 15-20 wt %, of a native (low molecular weight) potato protein; (ii) 53-72 wt %, preferably 55-70 wt %, of gelling starch; and (iii) 13-29 wt %, preferably 15-25 wt %, of HBS, provided that the total of (i), (ii) and (iii) is 100%. Preferably, the foam structuring composition comprises (i) 16-18 wt % of a native (low molecular weight) potato protein; (ii) 57-68 wt % of gelling starch; and (iii) 16-25 wt % of HBS. The weight ratio between components (i), (ii) and (iii) within the structuring composition can be in the range of between 1:4:1 to 3:10:4. The foam structuring composition is typically used in an amount of 1-30 wt %, preferably 10-20 wt %, like 12-17 wt %, of the slurry confectionery blend.

EXPERIMENTAL SECTION

Materials
Starches:
 Perfectagel 928: blend of oxidized acetylated starch and crosslinked hydroxypropylated starch according to EP 1146795 B1
 Perfectamyl Gel MB: Acid degraded and acetylated potato starch which is a "traditional gelling starch"
 Eliane MD6: Maltodextrin based on amylopectin potato starch obtained by enzymatically degradation using alpha amylase.

| Waxy maize HBS | maltodextrin |
| Potato HBS | maltodextrin |

Protein:
Solanic300: Low molecular weight potato protein (Avebe)
Hyfoama DSN: hydrolysed milkprotein (Kerry Ingredients)
Pisane C9 pea protein (±86% protein) Coscura
Egg albumin crystals (size; middle) Bouwhuis Saccharides:

| | |
|---|---|
| GPS Glucosweet 461 | Tereos Syral Belgium |
| Maltose syrup DE42 | CCI |
| Glucose syrup DE 42 | Belgosuc |

The degree of aeration can be expressed in:

Density(g/cm$^3$)=mass/volume

Or:

Overrun (%)=((Ws−Wf)/Ws)×100

Where:
Ws=Weight of 100 ml mass Pre-aeration
WF=Weight of 100 ml mass Post-aeration In the examples below overrun percentages are used, indicating maximum as well as extruded values. The percentage overrun extruded is the value measured when the aeration process is running stable, i.e. when a stable foam is obtained.

Example 1: Marshmallow Preparation

This example demonstrates a process for proving a vegetarian/vegan aerated confectionery product.

TABLE 1 recipe for Marshmallows

| | | Recipe | |
|---|---|---|---|
| Name | Supplier | % | °brix mix |
| Water | | 6.0% | |
| Sugar | Suikerunie | 40.7% | 40.7% |
| GPS Glucosweet 461 | Tereos | 40.5% | 33.2% |
| Startch Perfectagel 928 | Avebe | 8.0% | 6.6% |
| Solanic Protein 300 | Avebe | 2.8% | 2.5% |
| HBS | Avebe | 2.0% | 1.8% |
| Subtotal | | 100.0% | 84.7% |
| Water Evaporation | | | −0.15 |
| Cooked mass | | 99.84% | 83.1% |
| Vanillaflavour | | 0.15% | 0.1% |
| Total | | 100.0% | 83.2% |
| Final brix before aerating | | | 83.00% |

| Processing | |
|---|---|
| Cooker type | Jet |
| Temperature | |
| Premix (° C.) | 75 |
| Cooking (° C.) | 138 |
| Cooking conditions | |
| Cooking pressure | 2 bar |
| Vacuum pressure | −0.5 bar |
| Measurements | |
| °Brix mondomix | 83.0 |
| Inlet mondomix T (° C.) | 80-85 |
| Outlet T (° C.) | 85-100 |
| pH | 3.8 |
| Target Overrun | >400% |

Process

Water and syrup was added to the preheated pre-mixer and heated to 40° C. The protein and starch components were pre-mixed and dissolved using a high speed stirrer. This slurry was heated to 75° C. Sugar was added and temperature was set on 75° C. The confectionery mass was pumped into a jet cooker and heated to 138° C. by direct steam pressure (2 bar).

An advantage of the native LMW potato protein isolate (e.g. Solanic 300) is the resistance to high cooking temperatures and limited influence on viscosity in the process. Cooking with a jetcooker to 138° C. in a refraction with a high brix (78-85° brix) will not affect the foaming ability of the protein which allows simultaneous cooking of starch and potato protein.

In between the cooking and foaming step, it is preferred that the refraction is at least 80° brix, preferably between 82 and 85° brix. Dextrose powder can be added after cooking to adjust the refraction to a higher brix.

The cooked slurry was pumped into a vacuum cooler, where it was cooled and all air was removed (−0.5 bar) and a flavouring agent was added. The product (at 85° C.) was aerated using a Mondomixer. Marshmallows containing gelatin are aerated at a temperature of at least 45° C. and preferably between 50-65° C. However, when using (a gelling) starch according to the present invention the viscosity of the cooked product is too high, therefore a higher aerating temperature is preferred of, at least 80° C. and preferably 80-85° C.

Typical Mondomixer settings to aerate the product are as follows:

| Mondomixer settings | |
|---|---|
| Time | |
| P03 | |
| Pressure input | 7.0 |
| Mix head pressure | 4-5 |
| Mix head pressure | 4.2 |
| Mixhead temp. in ° C. | 81-87 |
| Mixhead temp. out ° C. | 88-100 |
| Revolution per minute PO2 | 80 |
| Flow P02 | 15 |
| Revolution p/m mixhead | 900-1100 |
| Velocity of mixing head (1) | 120-150 |
| Velocity of feeding pump (2) | 35-45 |
| P06 Tsp | 75-85 |
| Tpw | 80-85 |

The target overrun was between 400 and 600% (corresponding to a density of about 0.19-0.27 g/cm$^3$). The aerated product was extruded through a die to form a rope. This rope was collected on a baking sheet and dusted with dextrose powder. Afterwards the product was dusted with dextrose powder. After cooling at ambient temperature, the product was cut and packed.

Example 2: Effect of Adding HBS Using LMW Potato Protein/Gelling Starch in Premix The goal of this experiment is to obtain a product with a percentages overrun extruded of >400%. This percentage overrun represents the aimed density for a marshmallow. To obtain a stable foam with an overrun of >400% it is preferred to use at least 2% native LMW potato protein. When applied at a higher dosage, the overrun can be increased. For example, with a dosage of 3% Solanic 300 maximum overrun of 800% are reached.

TABLE 2

| BLEND | | | | Mondomixer: overrun | | |
|---|---|---|---|---|---|---|
| | | | | | Out put | |
| Protein % | 928% | HBS % | Remark | Max capacity % | % Extruded | Temp ° C. |
| 2.20% | 8.60% | 0.00% | Sticky | 450% | 309% | 86° C. |
| 2.20% | 8.60% | 4.00% | Foam | 570% | 538% | 88° C. |

The results of Table 2 demonstrate that without the use of HBS it is not possible to obtain a product with the desired overrun, thus and corresponding density. The foam obtained in a preparation without HBS results in a sticky product. Addition of HBS stabilizes the aerated foam and results in an improved overrun of the Solanic 300 protein. A marshmallow with 2% Solanic 300 without HBS did not result in a stable foam at >400% overrun. The extruded aerated product without HBS remains sticky and the product looks collapsed inside. The HBS starch helps to increase and stabilize the foam after aerating.

Example 3: Effect HBS Type (Waxy Maize Based Vs. Potato Based) and Dosing

TABLE 3

| BLEND | | | | Mondomixer: overrun | | |
|---|---|---|---|---|---|---|
| Protein % | 928% | HBS % | Remark | Max capacity % | % Extruded | Temp ° C. |
| 2.00% | 8.60% | 4% | Waxy maize HBS | 510% | 489% | 98° C. |
| 2.00% | 8.60% | 4% | Potato HBS | 520% | 520% | 99° C. |

Table 3 shows overrun results of foam experiments where various HBS grades from different sources are used. With both grades, waxy maize based HBS as well as potato based HBS the targeted overrun in extrusion is achieved, consequently the raw material for preparing highly branched starch has no influence.

In conventional marshmallows, gelatin is used for both foaming and gelling. Gelatin is generally added after the cooking step of the mixture before aerating to avoid that gelatin is degraded and looses its functionality.

TABLE 4

| BLEND | | | | Mondomixer: overrun | | |
|---|---|---|---|---|---|---|
| Protein % | 928% | HBS % | Remark | Max capacity % | % Extruded | Temp ° C. |
| 2.00% | 8.60% | 4% | added after cooking | 510% | 489% | 98° C. |
| 2.00% | 8.60% | 4% | added before cooking | 510% | 507% | 10° C. |

HBS is highly soluble, having minimum effect on viscosity of the cooked mass. Thus, it is possible to add the HBS starch either before or after cooking without any functionality change. The results of Table 4 show that adding highly branched starch either before or after cooking does not affect overrun results.

Example 4: Unique Properties of HBS

This example demonstrates the uniqueness of HBS. Instead of HBS, another branched starch (Eliane MD6) was used. Eliane MD6 is an enzymatically degraded amylopectin potato starch. The results are shown in Table 5.

TABLE 5

| BLEND | | | | Mondomixer: overrun | | |
|---|---|---|---|---|---|---|
| Protein % | 928% | HBS % | Remark | Max capacity % | % Extruded | Temp ° C. |
| 2.00% | 8.60% | 4.00% | HBS | 510% | 507% | 101° C. |
| 2.00% | 8.60% | 4.00% | replaced by Eliane MD6 | 354% | 300% | 94° C. |

The results demonstrate that in order to obtain a stable foam with low density it is necessary to have a highly branched starch obtained by enzymatic treatment with glycogen branching enzyme (EC 2.4.1.18).

Example 5: Effect of Dosage Native Potato Protein

TABLE 6

| BLEND | | | | Mondomixer: overrun | | |
|---|---|---|---|---|---|---|
| Protein % | 928% | HBS % | Remark | Max capacity % | % Extruded | Temp ° C. |
| 2.30% | 10.00% | 4.00% | | 530% | 423% | 100° C. |
| 2.50% | 10.00% | 4.00% | | 579% | 535% | 103° C. |
| 3.00% | 10.00% | 4.00% | | 632% | 598% | 102° C. |

Additional experiments were carried out to determine influence of dosage low molecular weight potato protein. Consistent with previous experiments it is concluded that a dosage of at least 2% of low molecular weight potato protein is preferred.

Example 6: Effect of HBS in Combination with Other Proteins

In this experiment the effect of HBS on proteins types other than native potato protein was tested.

TABLE 7

| BLEND | | | | Mondomixer: overrun | | |
|---|---|---|---|---|---|---|
| Protein % | 928% | HBS % | Remark | Max capacity % | % Extruded | Temp ° C. |
| 2.30% | 10.00% | 4.00% | LMW potato protein | 530% | 423% | 100° C. |
| 2.30% | 10.00% | 4.00% | Pea protein | 100% | 99% | 95° C. |
| 2.30% | 10.00% | 4.00% | Hyfoama milk | 350% | 316% | 93° C. |
| 2.30% | 10.00% | 4.00% | Egg protein | 300% | 295% | 96° C. |

As is shown in Table 7, none of the tested proteins gave the desired overrun and density as obtained using the low molecular weight native potato protein.

Example 7: Influence of Type of Gelling Starch

This example demonstrates that native potato protein and highly branched starch can be combined with different types of gelling starches in order to obtain a desirable result.

TABLE 8

| BLEND | | | | Mondomixer: overrun | | |
|---|---|---|---|---|---|---|
| Protein % | Gelling starch % | HBS % | Remark | Max capacity % | % Extruded | Temp ° C. |
| 2.90% | 9.00% | 2.00% | Perfectagel 928 (a) | 540 | 567 | 100° C. |
| 2.90% | 9.00% | 2.00% | Perfectamyl Gel MB (b) | 750 | 550 | 97° C. |

(a) Perfectagel 928: blend of oxidized acetylated starch and crosslinked hydroxypropylated starch according to EP 1146795 B1
(b) Perfectamyl Gel MB: Acid degraded and acetylated potato starch which is a "traditional gelling starch"

REFERENCES

Bárta J. et al., 2007 J. Food Process Eng. 31( ) p. 533-547
Bártová V. and Bárta J. 2008 Res. Agr. Eng. 54(4) p. 170-175
Bártová V and Bárta J. 2009 J. Agric. Food Chem. 57( ) p. 9028-9034
Graf A-M. et al., 2009 Chemie Ingenieur technik 81 (3) 267-274
Koningsveld van G. A. et al., 2002 J. Sci. Food Agric. 82( ) p. 134-142
Lindner P. et al., 1980 Food Chem. 6( ) p. 323-335
Lokra S. et al. 2009 Food Sci Technol 42( ) p. 906-913
Partsia Z. and Kiosseoglou V. 2001 Colloids Surfaces B 21( ) p. 69-74
Ralet MC and Guéguen J 2000 Lebensmittel Wiss Tech 33(5) p. 380-387
Ralla K. et al., 2012 J Sep Sci 35( ) p 1596-1602

The invention claimed is:

1. An aerated confectionery product comprising:
   a foam structuring composition comprising:
   (i) a native potato protein;
   (ii) a highly branched starch (HBS) obtained by treatment of starch or a starch derivative with glycogen branching enzyme (EC 2.4.1.18), and wherein said HBS has a molecular branching degree of at least 6%, wherein the molecular branching degree is defined as the percentage of a-1,6 glycosidic linkages of the total of α-1,6 and α-1,4 glycosidic linkages ((α-1,6 /(α-1,6 +a-1,4) *100; and
   (iii) a gelling starch distinct from HBS comprising a modified potato starch, acid-degraded starch, oxidative degraded starch or an enzymatically degraded starch,
   wherein the aerated confectionery product has a density of 0.1 to 0.5 $g/cm^3$.

2. The aerated confectionery product according to claim 1, wherein said native potato protein comprises a low molecular weight potato protein isolate, wherein said potato protein isolate has an isoelectric point above 5.5, a molecular weight of below 35 kDa and a glycoalkaloid concentration of less than 300 ppm.

3. The aerated confectionery product according to claim 2,
   wherein said low molecular weight potato protein isolate is obtainable by:
   centrifuging a flocculated potato fruit juice, thereby forming a supernatant;
   subjecting the supernatant to adsorption chromatography operated at a pH of less than 11 and a temperature of 5-35° C. using a mixed-mode adsorbent capable of binding potato protein, thereby adsorbing the native potato protein to the adsorbent; and
   eluting the low molecular weight potato protein isolate.

4. The aerated confectionery product according to claim 1, wherein said gelling starch comprises a modified potato starch, acid-degraded starch, oxidative degraded starch, and/ or enzymatically degraded starch, in combination with a crosslinked starch, such as crosslinked hydroxypropylated starch, an acetylated potato starch or an amylomaltase-treated starch.

5. The aerated confectionery product according to claim 4, comprising an acid degraded and acetylated potato starch or a blend of oxidized acetylated starch and crosslinked hydroxypropylated potato starch.

6. The aerated confectionery product according to claim 1, wherein the native potato protein is present in an amount of at least 0.3 wt %.

7. The aerated confectionery product according to claim 1, wherein said gelling starch is present in an amount of up to 12 wt %.

8. The aerated confectionery product according to claim 1, wherein the HBS is present in an amount of between 0.5-10 wt %.

9. The aerated confectionery product according to claim 1, further comprising 50-80 wt % of a saccharide component.

10. The aerated confectionery product according to claim 1, being essentially gelatin-free.

11. The aerated confectionery product according to claim 1, selected from the group consisting of marshmallows, angel kisses, guimauves and meringues.

12. A continuous method for preparing an aerated confectionery product having a density of 0.1 to 0.5 g/cm$^3$, comprising the steps of:
  A. providing a foam structuring composition comprising:
    (i) a native potato protein;
    (ii) a highly branched starch (HBS) obtained by treatment of starch or a starch derivative with glycogen branching enzyme (EC 2.4.1.18), and wherein said HBS has a molecular branching degree of at least 6%, wherein the molecular branching degree is defined as the percentage of α-1,6 glycosidic linkages of the total of α-1,6 and a-1,4 glycosidic linkages ((α-1,6 /(α-1,6 +α-1,4) *100; and
    (iii) a gelling starch distinct from HBS comprising a modified potato starch, acid-degraded starch, oxidative degraded starch or an enzymatically degraded starch;
  B. providing a slurry confectionery blend comprising:
    mixing about 50 to 80% of a saccharide component, about 1 to 30% moisture, and about 1 to 30% (dry weight basis) of the foam structuring composition to form a mixture; and
    heating the mixture by direct steam pressure to form the slurry confectionary blend;
  C. cooling the heated slurry confectionery blend in a vacuum cooler to obtain a confection blend;
  D. aerating the confection blend to form an aerated confection foam having a density of about 0.1 to 0.5 g/cm$^3$ and a temperature of at least 70° C.;
  E. extruding the aerated confection foam at a temperature of about 85-100° C. to form an aerated confection extrudate;
  F. cooling the aerated confection extrudate to form a set aerated confection extrudate; and
  G. forming the set aerated confection extrudate into pieces.

13. The aerated confectionery product according to claim 1, wherein said native potato protein comprises a low molecular weight potato protein isolate, wherein said potato protein isolate has an isoelectric point above 5.8, a molecular weight of 4-30 kDa, and a glycoalkaloid concentration of less than 300 ppm.

14. The aerated confectionery product according to claim 4, comprising an acid degraded and acetylated potato starch or a blend of oxidized acetylated starch and crosslinked hydroxypropylated potato starch in combination with HBS derived from potato starch or maize.

15. The aerated confectionery product according to claim 1, wherein the native potato protein is present in an amount of between 1-5 wt %.

16. The aerated confectionery product according to claim 1, wherein said gelling starch is present in an amount of 7.5 to 9 wt %.

17. The aerated confectionery product according to claim 1, wherein the HBS is present in an amount of between 1-6 wt %.

18. The aerated confectionery product according to claim 11, wherein the marshmallows are molded marshmallows, extruded marshmallows, or chocolate marshmallows.

19. The continuous method of claim 12, wherein the temperature of the aerated confection foam is between 90-105° C.

20. The aerated confectionery product according to claim 1, wherein the aerated confectionery product has a density of 0.19 to 0.27 g/cm$^3$.

* * * * *